US005878517A

United States Patent [19]

Gill

[11] Patent Number: 5,878,517

[45] **Date of Patent: *Mar. 9, 1999**

[54] SIGNAGE AND METHOD OF MANUFACTURING SAME

[75] Inventor: Forest P. Gill, Shawnee Mission, Kans.

[73] Assignee: Gill Studios, Inc., Shawnee Mission, Kans.

[ * ] Notice: The term of this patent shall not extend beyond the expiration date of Pat. No. 5,682,696.

[21] Appl. No.: 901,247

[22] Filed: Jul. 28, 1997

Related U.S. Application Data

[63] Continuation of Ser. No. 633,906, Apr. 17, 1996, Pat. No. 5,682,696, which is a continuation-in-part of Ser. No. 268,844, Jun. 30, 1994, abandoned.

[51] Int. Cl.[6] .......................... G06F 15/00

[52] U.S. Cl. .......................... 40/606; 248/156

[58] Field of Search .......................... 40/606, 607; 248/156

[56] References Cited

U.S. PATENT DOCUMENTS

| | | | |
|---|---|---|---|
| 3,217,437 | 11/1965 | Cobb | 40/607 X |
| 4,660,310 | 4/1987 | Farmer | 40/607 |
| 4,885,860 | 12/1989 | Huenefeld | 40/606 |
| 4,894,937 | 1/1990 | Davis | 40/606 |
| 5,042,183 | 8/1991 | Kennedy | 248/156 X |
| 5,247,769 | 9/1993 | Becker . | |
| 5,307,580 | 5/1994 | Farmer | 248/156 X |

*Primary Examiner*—Joanne Silbermann

*Attorney, Agent, or Firm*—Litman, McMahon & Brown, L.L.C.

[57] ABSTRACT

A sign assembly includes a sign and a bent wire bail for ground insertion. The sign is formed from a blank with adhesive strips for securing its inner surface together in a folded position.

4 Claims, 1 Drawing Sheet

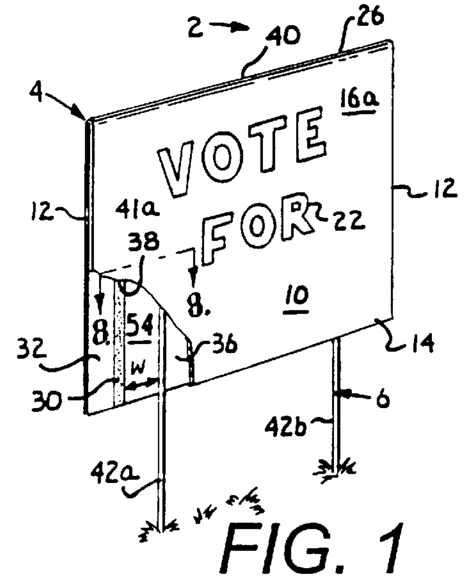
FIG. 1
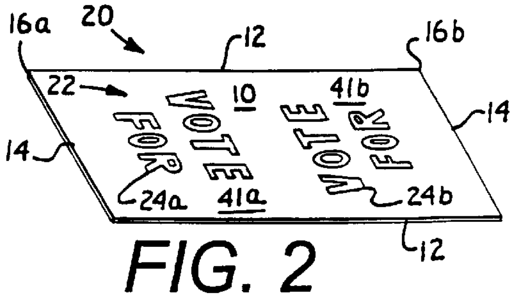
FIG. 2
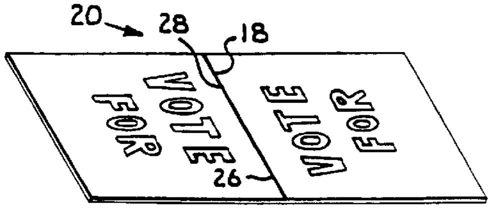
FIG. 3
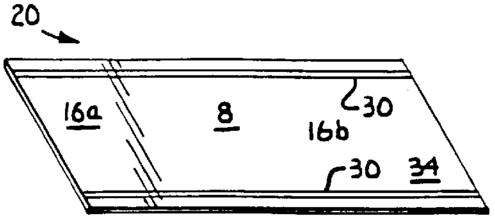
FIG. 4
FIG. 5
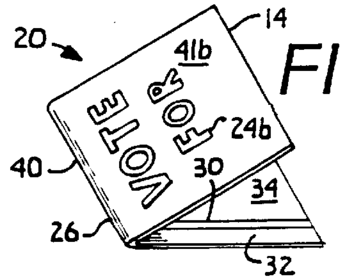
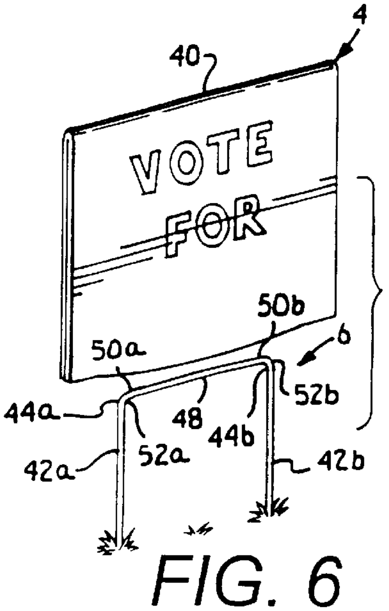
FIG. 6
FIG. 7
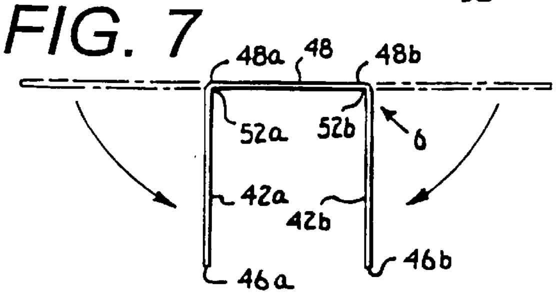
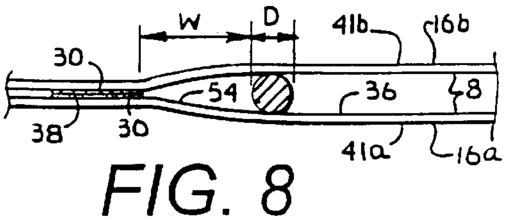
FIG. 8

SIGNAGE AND METHOD OF MANUFACTURING SAME

CROSS-REFERENCE TO RELATED APPLICATION

This application is a continuation of U.S. patent application Ser. No. 08/633,906 for SIGNAGE AND METHOD OF MANUFACTURING, filed Apr. 17, 1996, now U.S. Pat. No. 5,682,696 which is a continuation-in-part of U.S. patent application Ser. No. 08/268,844 for TWO-SIDED YARD SIGN AND METHOD OF MANUFACTURING SAME, filed Jun. 30, 1994, now abandoned.

BACKGROUND OF THE INVENTION

1. Field of the Invention

The present invention relates generally to signage, and in particular to a two-sided yard sign with adhesively connected to halves or panels forming a pocket to receive a wire bail in frictional engagement therewith.

2. Description of the Related Art

Various types of signage have heretofore been devised to meet the requirements of particular applications. Resistance to the elements can be an important factor in exterior signage. Temporary signage generally requires some ability to resist the elements, but for shorter time periods than permanent exterior signage.

Examples of temporary exterior signage include signs promoting political candidates, signs advertising particular events, and commercial signage such as signs which offer property for sale or lease.

Cost is often an important factor in temporary signage since campaign and advertising funds are generally expended in ways which are intended to achieve maximum exposure and coverage. Thus, the unit cost of signage should generally be kept as low as possible so that the maximum number of signs can be procured with a given amount of funds. Other important factors for political and advertising signage include sign blanks consisting of single panels printed on both sides and attached to wooden mounting stakes. However, such stakes tend to obscure at least a portion of one side of the single panel and moreover complicate assembly since the stakes must be driven and the signs attached thereto, generally with mechanical fastening means such as staples or nails.

Another type of temporary signage which is commonly used for political and commercial purposes consists of a sign blank printed on one side with mirror, reverse image subject matter on both halves and provided with a medial fold line for displaying the same image on both sides when the sign blank is folded double. The side edges of such previous two-sided signs were commonly stapled to form downwardly-open pockets between the sign panels. Such signs could be installed by providing wire bails with inverted U-shaped configurations which were driven into the ground and then partly inserted into the sign pocket for mounting same. Such previous signage suffered a disadvantage in that the stapling of the side edges was not readily accomplished with existing automated equipment for printing and folding signs, and tended to slow the assembly and installation of signage in the field. Thus, stapling the folded sign blanks tended to either add to the expense of manufacturing such signage, or if left to the field installer tended to increase the labor required for field assembly and installation.

Automated equipment is commercially available for cutting, printing, folding and gluing various products from sheet materials. For example, containers such as boxes and envelopes are often manufactured using automated equipment for cutting blanks from paper and card stock, printing selected surfaces and panels, folding the printed blank and adhesively connecting certain panels at adhesive seams to provide the necessary pockets, enclosures, etc. Such equipment is highly developed in the envelope manufacturing field and is capable of automatically manufacturing large quantities of envelopes and similar products at relatively rapid rates.

Heretofore such automated manufacturing equipment has not been used in the production of signage with the advantages and features of the present invention.

SUMMARY OF THE INVENTION

In the practice of the present invention, a two-sided yard sign assembly is provided which includes a sign and a bail for mounting the sign thereon. The sign is formed from a blank including inner and outer surfaces and is divided into two halves or panels by a medial, scored fold line. Each panel is printed with subject matter on the blank outer surface. The subject matter on each panel can be a reverse, mirror image of the subject matter on the other panel whereby both sides of the folded sign present the same image. A pair of adhesive strips are applied to the sign inner surface in parallel relation with respect to side edges thereof and form side seams when the sign blank is folded. The wire bail has an inverted U-shaped configuration and is adapted for driving into the ground and for insertion into a pocket formed by the sign blank.

In the practice of the method of the present invention, automated equipment is utilized for printing, scoring and folding the sign blank, and for applying the adhesive strips thereto. The wire bail can be bent from a length of wire to its desired configuration.

OBJECTS AND ADVANTAGES OF THE INVENTION

The principal objects and advantages of the present invention include: providing a two-sided yard sign assembly; providing such a sign assembly which can be manufactured with automated equipment; providing such a sign assembly which has a sign blank with printing on an exterior surface thereof and which is folded and glued to form a two-sided sign with a downwardly-open pocket; providing such a sign assembly which can be frictionally mounted on a wire bail; providing such a sign assembly which is relatively inexpensive to manufacture; providing such a sign assembly which is relatively easy to assemble; providing such a sign assembly which can be manufactured for a relatively low cost; providing such a sign assembly with good aesthetic qualities; providing such a sign assembly which presents a uniform appearance from both sides; and providing such a sign assembly which is particularly well adapted for temporary usage.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE INVENTION

FIG. 1 is a perspective view of a two-sided yard sign assembly embodying the present invention.

FIG. 2 is a perspective view of a blank thereof, particularly showing an outer surface thereof.

FIG. 3 is a perspective view of the blank, particularly showing an outer surface thereof.

FIG. 4 is a perspective view of the blank, particularly showing an inner surface thereof.

FIG. 5 is a perspective view of the blank, shown being folded.

FIG. 6 is an exploded perspective view thereof.

FIG. 7 is an elevational view of a wire bail thereof.

FIG. 8 is a horizontal cross-sectional view thereof taken generally along line 8—8 in FIG. 1.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a two-sided yard sign assembly embodying the present invention. The sign assembly 2 generally comprises a sign 4 and a bail 6.

II. Sign 4

The sign 4 can comprise any suitable, printable material such as card stock. The sign 4 includes: inner and outer surfaces 8, 10; opposite, parallel side edges 12; opposite end edges 14; and first and second halves or panels 16*a*, 16*b* demarcated by a medial line 18 extending between said side edges 12 in parallel, spaced relation generally midway between the end edges 14. A sign blank 20 is formed as shown in FIG. 2 with a generally, flat, rectangular configuration. Suitable printing 22 is applied to the sign blank outer surface 10 and can comprise identical subject matter printed as reverse, mirror images 24*a,b* on the respective sign blank halves or panels 16*a*, 16*b*. The printing 22 can comprise any suitable ink or coating material, which preferably is sufficiently weatherproof for the ambient conditions to which the sign assembly 2 will be exposed. Waterproof and water-resistant inks and coatings are well known and can be utilized for applying the printing 22 for use in exterior environments. Moreover, a relatively high gloss finish may be preferred for the printing 22 for aesthetic purposes.

A score line 26 is formed along the medial line 18 in the sign blank outer surface 10 to facilitate folding. The printing 22 can include suitable center line markings 28 to locate the score line 26. A pair of adhesive strips 30 are applied to the sign blank inner surface 8 between the end edges 14 thereof and form unsecured edge portions 32 adjacent respective side edges 12 and an unsecured middle portion 34 bounded by the adhesive strips 30 and the end edges 14. With the sign blank 20 in its folded configuration, a pocket 36 is formed between the inner surface 8 of the sign blank halves 16*a*, 16*b* which is bounded by side seams 38 formed by the adhesively attached adhesive strips 30 and by a top edge 40 formed along the score line 26. The pocket 36 is downwardly open along the end edges 14 between the side seams 38.

III. Bail 6

The bail 6 includes first and second legs 42*a,b* with upper ends 44*a,b* and lower ends 46*a,b*. A bail cross piece 48 extends between the legs 42*a*, 42*b* and includes cross piece ends 50*a*, 50*b* respectively connected to the leg upper ends 44*a*, 44*b* at bail corners 52*a*, 52*b*. The bail 6 can comprise a single piece of a suitable material, such as steel wire, bent at the bail corners 52*a*, 52*b* to form the general configuration of an inverted "U".

IV. Manufacturing Method

A method of manufacturing the yard signage 2 includes the steps of cutting a rectangular sign blank 20 from a suitable material such as card stock, scoring the sign blank 20 along a medial line 18 to form a score line 26 and printing an outer surface 10 of the sign blank 20 with indicia or messages comprising reverse mirror images 24*a*, 24*b* on opposite sign blank halves 16*a*, 16*b*. The adhesive strips 30 are applied to the sign blank inner surface 8 in parallel, spaced relation with respect to the side edges 12 between the middle portion 34 and respective unsecured edges 32. The sign blank 20, with printing and adhesive applied thereto, is then folded along the score line 26, the respective opposed portions of the adhesive strips 30 engage each other along the side seams 38 and a downwardly open pocket 36 is formed.

The bail 6 can be cut from steel wire stock to a suitable length and bent to form the corners 52*a*, 52*b*.

Final assembly of the yard signage 2 can be accomplished either as part of the manufacturing process in situ when the signage 2 is installed. However, in many situations it would be more convenient to first install the bail 6 by embedding the lower ends 46*a*, 46*b* of its legs 42*a*, 42*b* in the ground, and then placing the sign 4 thereover by inserting the cross piece 48 and the leg upper ends 44*a*, 44*b* into the pocket 36 to a position where the cross piece 48 is in closely-spaced proximity to the sign top edge 40. An installer can thus grasp the bail 6 at its cross piece 48 to facilitate exerting a downward force on the bail 6 to force its legs 42*a*, 42*b* a sufficient distance into the ground. Moreover, installation of the bail 6 prior to placing the sign 4 can reduce the possibility of damage to the sign 4 which might otherwise might occur during installation. For example, if the sign 4 is mounted on the bail 6 prior to installation and the bail 6 buckles under downward pressure, the sign 4 could be torn. However, by placing the bail 6 prior to mounting the sign 4, the bail 6 can be straightened relatively easily if bent during installation, and an undamaged sign 4 can be mounted on a restraightened bail 6 without noticeably effecting the appearance of the completed signage 2.

The folded sign 4 cooperates with the bail 6 to provide a relatively secure frictional engagement therebetween without the necessity of additional fastening means under normal conditions. More specifically, the spacing of the seams 38 is slightly greater than the width of the bail 6 whereby compression spaces 54 are formed between the side seams 38 and respective bail legs 42*a*, 42*b*, which compression spaces 54 have widths W which have a predetermined ratio with respect to the diameter D of the legs 42*a*, 42*b*. Such ratio is preferably between 2:1 and 8:1 whereby insertion of the bail 6 into the pocket 36 forces the sign blank halves 16*a*, 16*b* to diverge across the compression spaces 54 and thus tightly clamp the bail 6. Such clamping force can be increased by reducing the width W of the compression spaces 54 and vice-versa. However, if the compression spaces 54 are too narrow (i.e., the W/D ratio is too low), the sign blank 20 can be creased in a manner which would reduce its frictional holding power and possibly form an unsightly crease in the sign blank outer surface 10. By properly preselecting the W/D ratio, taking into the account the nature of the material comprising the sign blank 20, a relatively tight, frictional engagement can be formed between the sign 4 and the bail 6 whereby the assembled signage 2 resists disassembly under typical ambient conditions, at least for the limited periods of time appropriate for temporary signage. The adhesive strips 30 can form relatively secure side seams 38 with the sign blank inner surface secured in relatively flat, coextensive engagement over substantially the entire inner surface 8 whereby the aforedescribed frictional holding power on the bail 6 can be maximized.

It is to be understood that while certain forms of the present invention have been illustrated and described herein, it is not to be limited to the specific forms or arrangement of parts described and shown.

What is claimed and desired to be secured by Letters Patent is as follows:

1. A sign assembly, which includes:

(a) a sign comprising a sign blank with inner and outer surfaces, opposite side edges, opposite end edges, opposite panels and a fold line separating said panels, said sign blank outer surface having printing thereon;

(b) a pair of adhesive side seams securing said sign panels together at said inner surface, each of said side seams extending in generally parallel relation to a respective side edge;

(c) said sign forming a top edge along said fold line with said sign panels being folded with respect to each other; said top edge dividing said inner surface into facing inner surfaces;

(d) said sign forming a pocket lined by said inner surfaces of said sign panels, said pocket being bounded by said side seams and said top edge and open between said end edges;

(e) a bail including a pair of legs each having upper and lower ends and a crosspiece with opposite ends, said crosspiece opposite ends being attached to said leg upper ends;

(f) said bail having a width less than the width of said pocket;

(g) a score line extending between said side edges and located between said end edges of said sign blank along said fold line thereof;

(h) compression spaces formed along the pocket boundaries adjacent to said side seams and said top edge; and (i) said folded sign being substantially entirely frictionally retained on said bail by means of said bail legs being frictionally retained in said compression spaces adjacent to said side seams respectively and by means of said crosspiece being frictionally retained in said compression space adjacent to said top edge along substantially the entire length of said crosspiece.

2. The sign assembly as set forth in claim 1 wherein said printing on said blank outer surface is located on both of said opposed panels.

3. The sign assembly as set forth in claim 1 wherein said adhesive side seams comprise substantially continuous strips of adhesive extending between said sign blank opposite end edges.

4. The sign assembly as set forth in claim 1 wherein said bail legs and crosspiece are formed by bending a continuous length of wire at the attachments of said leg upper ends to said crosspiece opposite ends.

* * * * *